UNITED STATES PATENT OFFICE.

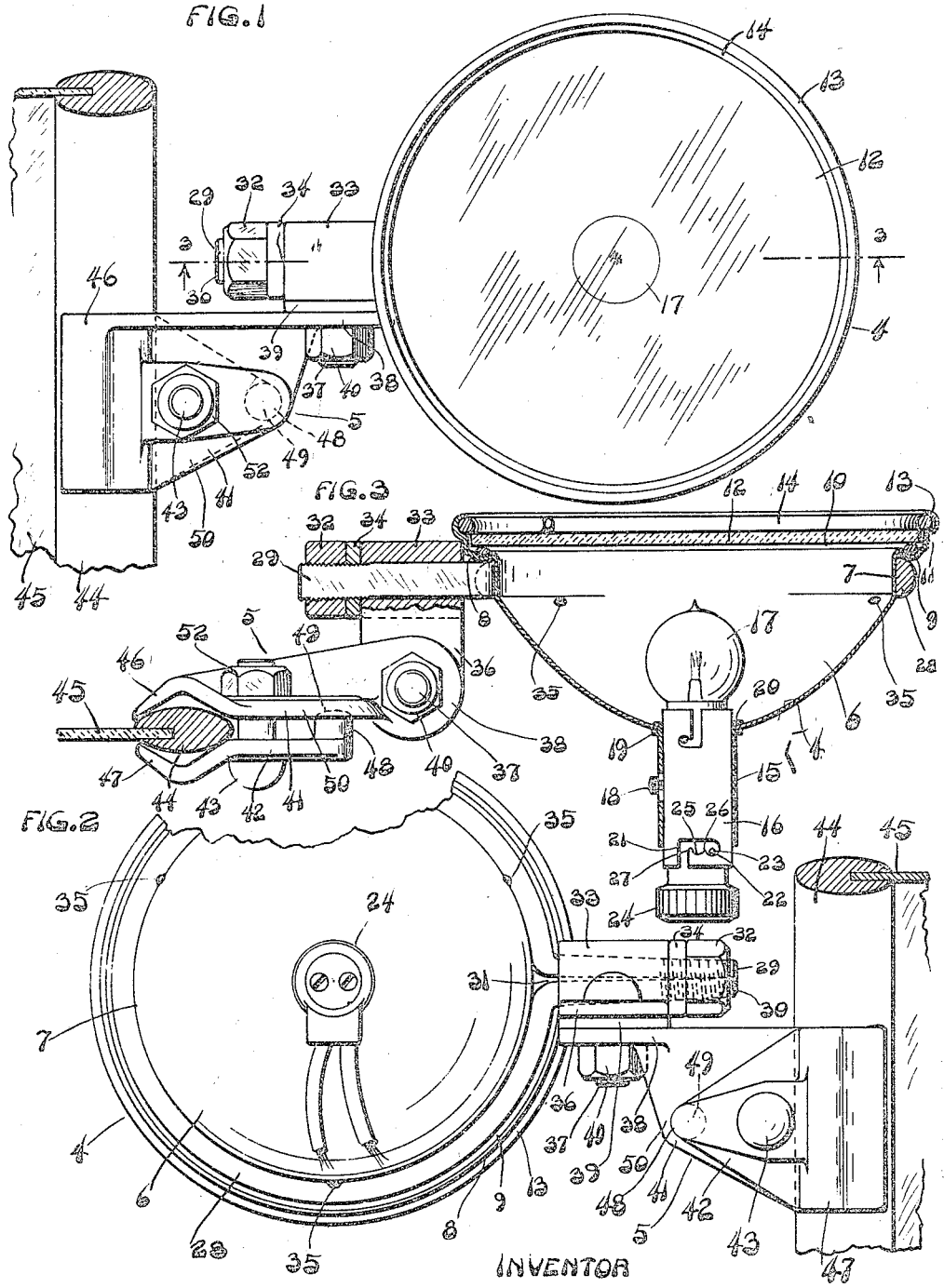

EUGENE A. KUEN, OF CINCINNATI, OHIO

AUTOMOBILE-LAMP.

1,252,907.    Specification of Letters Patent.    Patented Jan. 8, 1918.

Application filed April 25, 1917. Serial No. 164,577.

*To all whom it may concern:*

Be it known that I, EUGENE A. KUEN, a citizen of the United States, residing at Cincinnati, in the county of Hamilton and State of Ohio, have invented a new and useful Improvement in Automobile-Lamps, of which the following is a specification.

An object of my invention is to produce an improved dirigible automobile lamp of the type adapted to be clamped upon the frames of automobile windshields, in which the number of parts necessary to construct my improved lamp are reduced as compared to the number of parts necessary to construct lamps of the same type now on the market.

A further object is to produce an improved lamp of the above described type in which cheapness of construction and ease of manufacture are attained.

A further object is to produce an automobile lamp in which an improved means is provided for mounting the body of the lamp adjustably.

These and other objects are attained in the lamp described in the following specification and illustrated in the accompanying drawing in which:

Figure 1 is a front view of a lamp embodying my invention attached to the frame of an automobile windshield which is shown fragmentally.

Fig. 2 is a back view of my improved lamp, a portion being broken away for convenience of illustration, attached to the frame of an automobile wind shield which is shown fragmentally.

Fig. 3 is a transverse sectional view of the lamp body and a portion of the mounting means of my improved lamp taken on the line 3—3 of Fig. 1, the remainder of the mounting means being shown in elevation attached to the frame of a windshield which is shown in section.

The two principal elements of my improved lamp consist of a lamp body 4 and a clamp 5. Body 4 is a shell of drawn metal having a portion 6 which is of parabolic formation, a portion 7 which is of cylindrical formation, and a portion 8 which is shaped to provide a grooved section 9 for the reception of a cushion packing ring 18, a cylindrical section 11 for the reception of a glass disk 12 to close the front of the body, and a second grooved section 13 for the reception of a split wire glass retaining ring 14. The interior of portion 6 is plated and highly polished so that its parabolic formation may serve as a reflector for the light rays.

Centrally of portion 6 an opening is made for the reception of a socket 15 in which the connector tube 16 of an electric lamp bulb 17 is adjustably mounted. A set screw 18 which is screwed into the tube and engages a slot 19 in the socket is provided to secure the tube in adjusted positions for the proper focusing of the lamp. Socket 15 is provided with a shoulder 19 and an extension 20 which passes through the opening and is turned over to secure the sleeve to the body when the shoulder is brought into engagement with the rear of the body. The connector tube at its rear is provided with a bayonet slot 21 having a notch 22 for the reception of the pin 23 of a connector 24 when the lamp is illuminated and a notch 25 for the reception of the pin when the connector is rotated to turn off the light. A shoulder 26 permits the connector pin to pass easily from one notch to the other and to be retained in the desired notch without danger of being displaced therefrom and a higher shoulder 27 prevents the pin entering the disengaging portion of the slot until the connector has been brought to this position to remove it for any purpose. Socket 15 and connector 24 form the handle by means of which the lamp is manipulated.

Embracing the body 4 in engagement with section 7 is a band 28 of half round metal having its ends 29 and 30 bent outwardly and in such positions with relation to the loop of the band that when the loop is tightened upon section 7 there is a space between the ends adjacent to section 7 as disclosed at 31 in Fig. 2. Projections 35 are formed in portion 6 of the body to prevent its displacement relatively to the band. The ends 29 and 30 are screw threaded for a distance from their ends for the reception of a nut 32. The unthreaded portions of the ends enter a slightly tapered passage through a member 33. Therefore the action of swivel member 33, when it is drawn up onto the ends of the band 28 by nut 32, is to draw the band tightly around section 7 of the lamp body to prevent its displacement or movement relatively thereto. I preferably locate a washer 34 between nut 32 and swivel 33 for the purpose of preventing the frictional contact of the nut with the swivel member from loosening the nut when the lamp body is turned to rotate the ends of its band 28 in the swivel, the opening in the washer being of such a shape that it turns with the ends 29 and 30 when they are rotated within the swivel.

Swivel 33 is provided with a rearwardly extending flange 36 through which passes a bolt 37 to secure swivel 33 to flange 38 of clamp 5. Between flanges 36 and 38 a friction washer 39 of fiber or similar material is provided so that when nut 40 of bolt 37 is tightened the swivel will be held against displacement when moved to its adjusted position.

Clamp 5 consists of a member 41 upon which flange 38 is formed, a coöperating member 42, and a bolt 43 adapted to retain the members in clamping engagement upon the frame 44 of a windshield 45. The members are provided with clamp jaws 46 and 47 which are adapted to engage the frame in the manner shown in Fig. 3. At the opposite end of member 42 a lug 48 is provided for coöperation with a recess 49 formed in rib 50 of clamp member 41 for holding clamp member 42 parallel with clamp member 41 when clamp bolt 43 is drawn up by its nut 52.

It will be seen that in my improved construction I provided means for changing the position of the lamp body to cast the light rays horizontally in different directions as well as vertically in different directions and in any position intermediate these planes, so that substantially universal movement of the lamp body may be obtained to cast the light rays in any desired spot.

In addition to this I have provided a lamp construction in which the body performs the function of a reflector, one in which no riveting is necessary, one which may be quickly taken apart for repairs and cleaning, and as easily and rapidly reassembled.

Having thus described my invention, what I claim is:—

1. A dirigible automobile lamp consisting of a body adapted to receive an encircling band upon a portion of its surface, a band encircling the band-receiving portion of the body and having its ends bent to substantially parallel positions to form a shaft, a member adapted to receive the ends of the band to mount the body pivotally thereon, and means engaging the ends of the band, adapted to clamp it in position around the body.

2. An automobile lamp consisting of a body adapted to receive an encircling band upon a portion of its surface, a band encircling the band receiving portion of the body and having its ends bent to substantially parallel positions, a member adapted to receive the ends of the band, and means engaging the ends of the band, adapted to be moved to adjusted positions along the ends to clamp the band in position around the body, and a lamp connector mounted in the body, having a slot formed therein consisting of a longitudinally extending portion and a transversely extending portion, said transversely extending portion having a depression therein, and a second depression therein adjacent to the first mentioned depression and with the first mentioned depression between it and the longitudinally extending portion of the slot.

3. An automobile lamp consisting of a metal shell adapted to form the body of the lamp and having its inner surface adapted to form the reflector of the lamp, an adjustable clamp adapted to secure the body in adjusted positions upon a portion of an automobile to which it is to be attached, and means connecting the body and the clamp, consisting of a band encircling the body and having its ends bent to substantially parallel positions to form a shaft, a member adapted to receive the ends of the band to mount the body pivotally thereon, and means engaging the ends of the band adapted to clamp it in position around the body, said clamp consisting of a jaw pivotally connected with the member, a second jaw having means adapted to maintain it in parallel relation with the first mentioned jaw, and a bolt adapted to clamp the jaws upon a portion of an automobile to which it is to be attached.

EUGENE A. KUHN.